Aug. 22, 1961 A. M. BOUDREAU 2,997,308
CONVERTIBLE BOY-GIRL BIKES
Filed Sept. 5, 1958 2 Sheets-Sheet 1
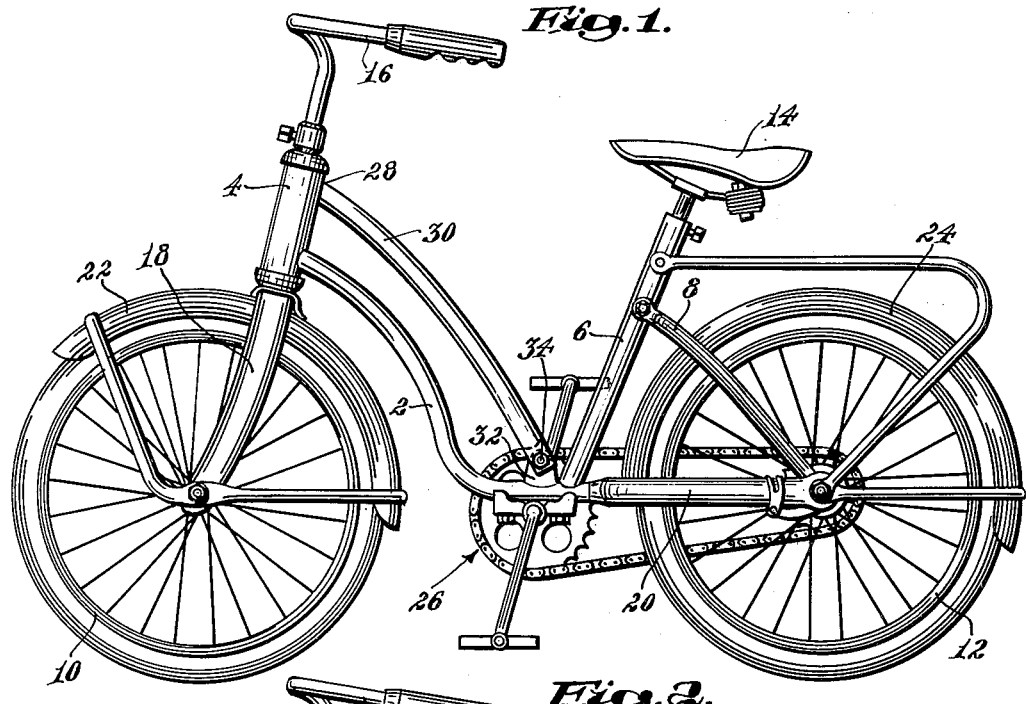
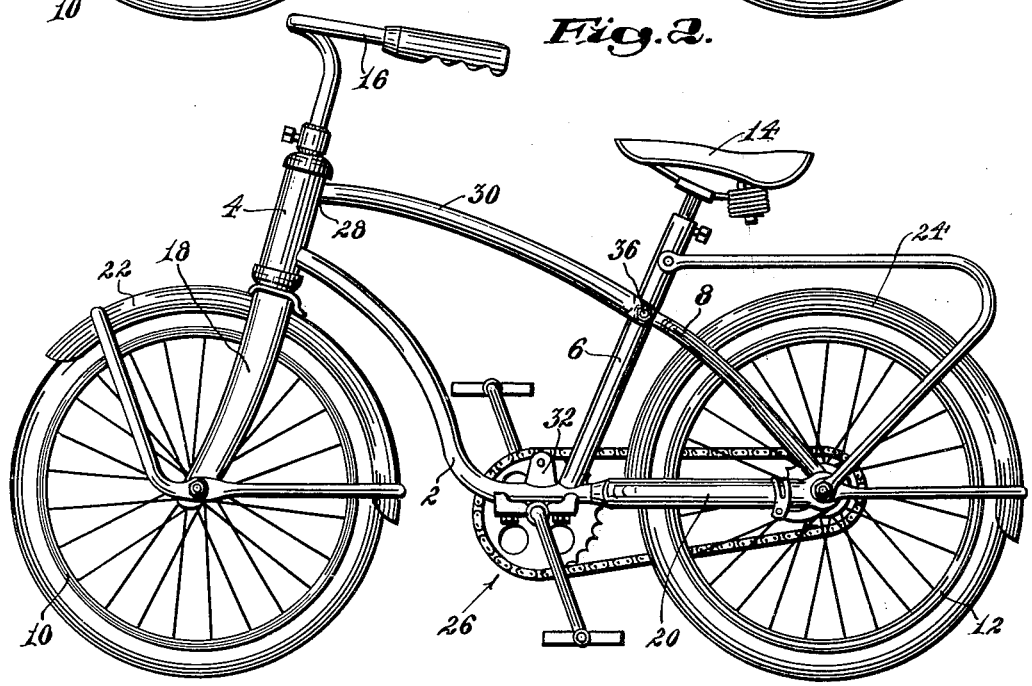
Inventor:
Alban M. Boudreau,
by John H. McKenna
Attorney

United States Patent Office 2,997,308
Patented Aug. 22, 1961

2,997,308
CONVERTIBLE BOY-GIRL BIKES
Alban M. Boudreau, Gardner, Mass., assignor to Hedstrom Union Company, Fitchburg, Mass., a corporation of Massachusetts
Filed Sept. 5, 1958, Ser. No. 759,163
4 Claims. (Cl. 280—7.11)

This invention relates to improvements in bicycles and, more particularly, provides improvements in bicycle frames and especially the frames of the smaller sizes of bicycles, such as side-walk bikes, for example. The invention provides a frame structure including a member which is readily adjustable to convert a bicycle or bike from a boy's model to a girl's model, or vice versa.

It is among the objects of the invention to provide a bicycle frame structure wherein a frame cross-bar member is shiftable from an upper essentially horizontal position wherein it conditions the bicycle or bike for use as a boy's model, to a lower inclined position wherein it conditions the bicycle or bike for use as a girl's model.

Another object of the invention is to provide, in a bicycle or bike, a tubular frame cross-bar element, one end of which is adjustably pivotally supported in an elliptical opening in a wall of the frame head and the other end of which is easily movable from a predetermined elevated generally horizontal position to a predetermined lower inclined position.

Yet another object of the invention is to provide in a bicycle or bike a shiftable frame cross-bar member which considerably reduces the cost of any individual vehicle by simplification of its frame structure, and which eliminates, in manufacture, any distinction between girl's and boy's models, whereby manufacturing procedures and structure may be uniform for both girl's and boy's models.

It is, moreover, my purpose and object generally to improve the structure and utility of bicycles and specifically such bicycles of the convertible sidewalk variety.

In the accompanying drawings:

FIG. 1 is a side elevation of a girl's model bicycle or bike embodying features of the invention;

FIG. 2 is a similar view of the bicycle or bike of FIG. 1 converted to a boy's model, in accordance with teachings of the invention;

Figure 3:
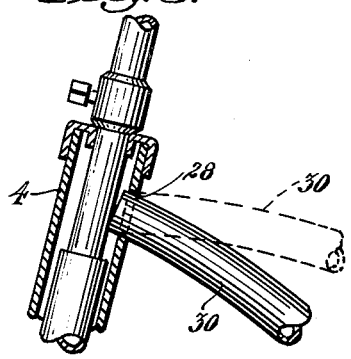
FIG. 3 is a fragmentary side elevation of the bicycle or bike of FIGS. 1 and 2, on a larger scale, with the frame head in cross-section, and showing, by full lines, the forward end of the adjustable bar element in its FIG. 2 position and showing it, by dotted lines, in its FIG. 1 position.
Figure 4:
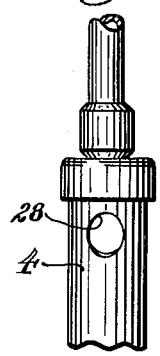
FIG. 4 is a fragmentary rear elevation of the bicycle frame head of FIG. 3 showing the elliptical opening in which the forward end of the adjustable bar element is supported.
Figure 5:
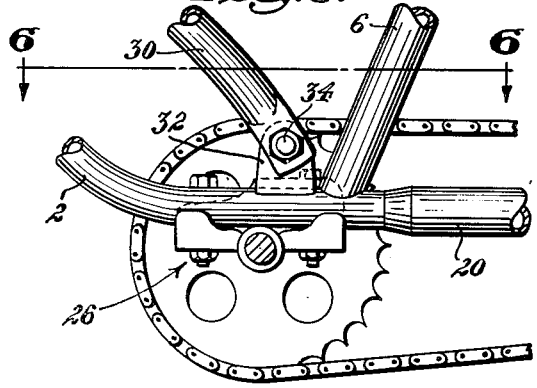
FIG. 5 is a fragmentary side elevation of the sprocket and pedal supporting frame portions of the bicycle or bike of FIGS. 1 and 2, on the scale of FIGS. 3 and 4, with the pedal shaft in cross-section and with the rear end portion of the adjustable bar element secured in its FIG. 1 position.
Figure 7:
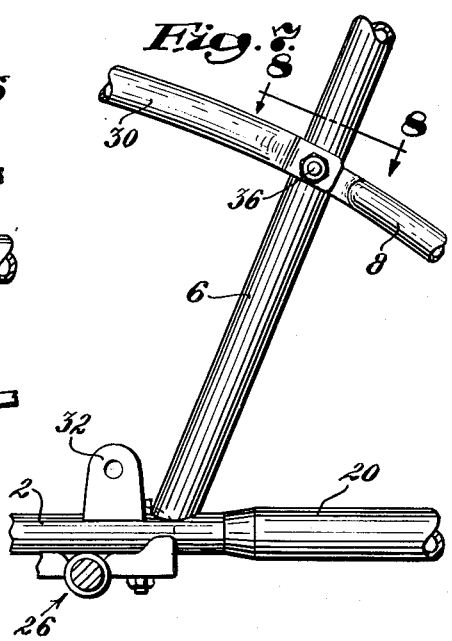
FIG. 7 is a fragmentary side elevation, on the scale of FIGS. 3–5, of the middle portion of the frame with the rear end portion of the adjustable bar element secured in its elevated FIG. 2 position, the pedal shaft being in cross-section and other parts omitted.
Figure 6:
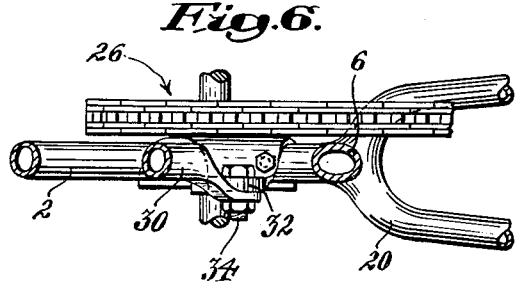
FIG. 6 is a cross-sectional view approximately along line 6—6 of FIG. 5.
Figure 8:
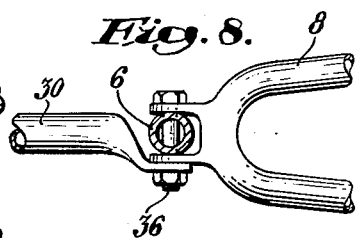
FIG. 8 is a cross-sectional view, approximately on line 8—8 of FIG. 7, with lower parts omitted.

Referring to the drawings, the bicycle, as best seen in FIGS. 1 and 2 has a frame structure comprising base frame 2, frame head 4, upright seat-supporting frame member 6, and rear frame member 8. The front and rear wheels 10, 12, seat 14, handle bars 16, forks 18, 20, fenders 22, 24 and driving mechanism 26 may be suitably attached to the frame structure in any conventional manner and constitute no part of the present invention.

Frame head 4 has an opening 28 therein which is slightly elliptical in shape, having its major axis in general parallelism with the axis of frame head 4, and being located above and in a line with the junction of frame head 4 and base frame member 2.

A tubular frame cross-bar member 30 has a diameter slightly less than the minor diameter of the elliptical opening 28 in frame head 4 and has its forward end inserted in opening 28 and resting on the lower wall of the opening.

Cross-bar member 30, being slightly curved, has sufficient length for spanning the distance between frame head 4 and the upright frame member 6, as in FIG. 2, and for spanning the distance between frame head 4 and an ear 32 which is provided on base frame 2 at the region of its juncture with upright frame member 6. The rear end of member 30 may be secured to ear 32 by any suitable means such as bolt 34 to provide the girl's model bicycle or bike of FIG. 1, or it may be secured to upright frame member 6 by a bolt 36 which conveniently may secure also the forward end of rear frame member 8 to member 6, to provide the boy's model bicycle or bike of FIG. 2.

Thus, all parts of girl's and boy's bicycles or bikes may be completely the same, excepting the bolts 34 and 36.

It is a feature of the invention that the forward end of adjustable cross-bar member 30 is simply and relatively loosely supported in hole 28 of frame head 4 but substantially closes the hole 28 in each position of adjustment of member 30. The forward end of member 30 rests on the bottom wall of hole 28 and pivots on said wall when the member 30 is being adjusted. However, when member 30 is in either position of secured adjustment, its portion within hole 28 substantially engages both upper and lower wall portions of the elliptical hole, leaving no prominent un-closed portion of the hole noticeably visible at the juncture. In FIG. 3, it will be observed that member 30, in its full line position, engages the lower wall portion of hole 28 at the outer edge of the hole and engages the upper wall portion of the hole at the inner edge of the hole, and that said member in its dotted position engages the lower wall portion of hole 28 at the inner edge of the hole and engages the upper wall portion of the hole at the outer edge of the hole. This feature simplifies the frame construction as well as permitting ready selection of, or adjustment of, the position of member 30. Yet member 30 has demonstrated its ability to contribute a needed amount of stabilizing reinforcing strength to the frame in each of its positions of secured adjustment.

As clearly shown in FIG. 3 the forward end of crossbar 30 is rigidly supported endwise, when received as described in the hole 28 of frame head 4, by its abutting the steering shaft, against which it tends to be thrust in both its said positions of adjustment.

Details of the disclosed structure may be varied as may be desired within the scope of the appended claims, and it is intended that the patent shall cover by suitable expression in the appended claims, whatever features of patentable novelty exist in the invention disclosed.

I claim as my invention:

1. In a bicycle having a frame including an upright tubular frame head, a frame cross-bar member movable between two positions, said frame head having an elongated opening in a wall thereof, and one end of said cross-bar member being inserted in said opening, said opening having a minor dimension slightly larger than said one cross-bar end and shaped also with a major axis in general parallelism with said frame head whereby said cross-bar member is relatively loosely supported for pivoting movement in said frame head, means associated with said frame for securing the other cross-bar end in an upper adjusted position in which said one cross-bar end engages the upper wall portion of said opening at the outer edge thereof and the lower wall portion of said opening at the inner edge thereof, and means associated with said frame for securing said other cross-bar end in a lower adjusted position in which said one cross-bar end engages the upper wall portion of said opening at the inner edge thereof and the lower wall portion of said opening at the outer edge thereof said cross-bar member thereby contributing a needed amount of stabilizing reinforcing strength to the frame in both of said adjusted positions.

2. In a bicycle having a frame including a frame head, a frame cross-bar member having a circular cross-section, said member adjustable between an upper position and a lower position, said frame head having an elongated opening in a wall thereof, and one end of said cross-bar member being inserted in said opening and slidably supported by an edge portion of said opening, said opening having its major dimension in substantial parallelism with the longitudinal axis of said frame head, and having its minor dimension slightly longer than the diameter of said cross-bar member, the other end of said cross-bar member being swingable between an upper position and a lower position with said member pivoting on said edge portion of said opening said one end of said cross bar member then engaging opposite edge portions of said opening in said frame head, and means at each of said positions for releasably securing said other end of said cross-bar member selectively in either of its said positions.

3. A bicycle frame having a lower frame portion, upright frame head and seat supporting portions spaced apart and fixed to said lower frame portion, a tubular cross-bar member, means defining an opening in a wall of said frame head, said opening being elliptical in shape, one end of said cross-bar member being inserted into said opening and resting on a lower edge portion of said opening, said edge portion then acting as a pivot about which the other end of said cross-bar member is swingable from an elevated position to a lower position, and means at said positions for releasably securing said other end of said cross-bar member to adjacent portions of said frame, said one end of said cross-bar member engaging opposite edge portions of and substantially closing the entire area of the elongated opening in said frame head when the said cross-bar is in each of its said positions.

4. A bicycle frame having a lower frame portion, and generally upright frame head and seat-supporting portions spaced substantially apart and connected in relatively fixed relation to said lower frame portion, a tubular frame cross-bar member having length for bridging the space between said frame head and seat-supporting portions of the frame, said cross-bar member having one end pivotally supported on said frame head whereby its other end may be moved between an upper position on said seat-supporting member and a lower position on said lower frame portion, said frame head having an elliptical opening in a wall thereof, and said one end of said cross-bar member being inserted in said opening and resting movably on an edge portion of said opening to provide the said pivotal support for said one end of the cross-bar member, and means for releasably securing said other end of the cross-bar member selectively in its said upper position and in its said lower position, said elliptical opening being substantially closed by said cross-bar member when said other end of the cross-bar member is secured in each of its said positions.

References Cited in the file of this patent

UNITED STATES PATENTS

| | | |
|---|---|---|
| 1,279,081 | Brock | Sept. 17, 1918 |
| 1,744,417 | Schwartz | Jan. 21, 1930 |
| 1,812,967 | Long | July 7, 1931 |
| 2,804,310 | Hokkanen | Aug. 27, 1957 |
| 2,850,306 | Gordon | Sept. 2, 1958 |

FOREIGN PATENTS

| | | |
|---|---|---|
| 615,499 | France | Oct. 12, 1956 |